United States Patent
Bre

[11] 3,823,794
[45] July 16, 1974

[54] ACOUSTICAL PANELS

[75] Inventor: Michel Bre, Paris, France

[73] Assignee: Saint-Gobian Industries, Neuilly-sur-Seine, France

[22] Filed: Nov. 24, 1972

[21] Appl. No.: 309,022

[30] Foreign Application Priority Data
Nov. 25, 1971 France .............................. 71.42222

[52] U.S. Cl............ 181/33 G, 181/33 GA, 161/161, 161/203, 156/99
[51] Int. Cl............................................. E04b 1/84
[58] Field of Search...... 181/33 G, 33 GA; 161/159, 161/161, 203, 204; 156/99

[56] References Cited
UNITED STATES PATENTS

| | | | |
|---|---|---|---|
| 2,086,506 | 7/1937 | Kranzlein | 161/204 |
| 2,303,125 | 11/1942 | Knight | 181/33 G UX |
| 3,087,565 | 4/1963 | Kerwin | 181/33 G UX |
| 3,249,178 | 5/1966 | Watters | 181/33 G UX |
| 3,467,572 | 9/1969 | Ahramjian | 181/33 G UX |
| 3,637,459 | 1/1972 | Parish et al. | 161/161 |

*Primary Examiner*—Richard B. Wilkinson
*Assistant Examiner*—John F. Gonzales
*Attorney, Agent, or Firm*—Pennie & Edmonds

[57] ABSTRACT

Transparent, translucent and opaque laminates are made from outer layers of vitreous material such as glass and ceramics and an interlayer of optical quality plastic. Many modifications are possible. The products are light, have a density near 1 and are very strong.

13 Claims, 9 Drawing Figures

ACOUSTICAL PANELS

This invention relates to laminated acoustical structures of vitreous construction and particularly to composite structures such as laminates of rigid sheets or plates of glass or other vitrified materials which are assembled and secured together by an adhesive interlayer. In particular, it has as an object to prepare layered panels, having outer layers of approximately equal mass, of which the insulating properties are demonstrably improved over known layered panels of the same type.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

Figure 1:
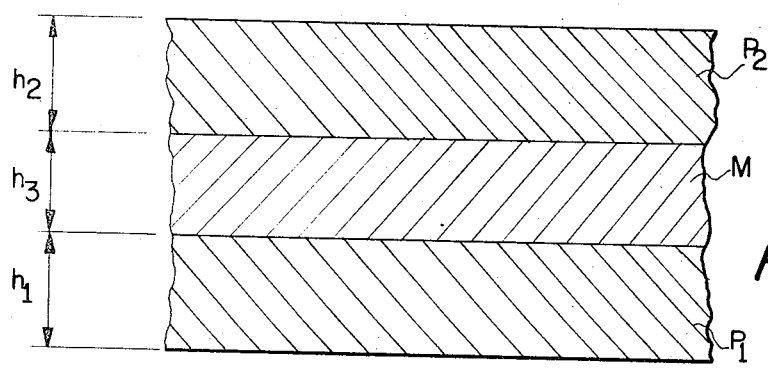

In the drawings, wherein like reference characters refer to like parts throughout the several views, FIG. 1 is a section on an enlarged scale through a part of such a panel, the parts $P_1$, $P_2$ being the outer layers of vitreous material such as glass and the layer M being the inter-layer of adhesive;

FIGS. 2, 3, 4 and 5 are graphs of performance, the significance of which will be explained hereinafter.

The new panels have the following characteristics of performance and structure, which differ notably from and constitute demonstrable superiority over prior types;

The thicknesses $h_1$ and $h_2$ of plates $P_1$, $P_2$, which are vitreous, are less than $20/C_L$ and are preferably near $10/C_L$, $C_L$ being the speed of propagation of longitudinal sound waves in the vitreous material; $h_1$, $h_2$ are expressed in meters; $C_L$ is expressed in meters per second;

The shearing modulus of the layered panel is at least equal to that of the interlayer M, it being understood that the shearing forces are applied parallel to the planes of the outer layers;

The factor of losses in the interlayer is equal or superior to 0.2, as measured by the Hopkinson-Davies method in the "Cahier Francais de Rheologie", 1967, 1 No. 5, pp 259–265.

This construction of panels improves the acoustical qualities through the whole range of audible sound not only because of the absorption of vibrations by the interlayer but because it shifts the critical frequency $f_c$ outside its place in the normalized spectrum toward the high frequencies.

Another characteristic of the invention provides that the thicknesses $h_1$, $h_2$ satisfy the relationship $R_1 h_1 = R_2 h_2$, in which $R_1$ and $R_2$ are the mass-volumes of each of the two outer layers, which leads to the use of symmetrical structures in which $h_1$ and $h_2$ are substantially equal when the outer layers are of the same material.

Another object of the invention useful in making the layered panels of the invention is to make the interlayer of liquid resins which are hardened in place after the panel has been assembled. These resins are copolymerizable compositions having the following components (U.S. Ser. No. 84194 of 10-26-70)

a. At least one oligoester which includes maleic groups of which each possesses a free acid function. These oligoesters are the products of the reaction of maleic anhydride with at least one polyhydroxylated organic compound in a ratio of one mole of maleic anhydride per hydroxyl group of the said compound;

b. At least one reticulating vinyl monomer representing 15 to 70 percent of the weight of the copolymerizing components; and c. At least one inhibitor of polymerization in 30 to 300 ppm of the weight of the polymerizing components.

The oligoesters are favorably represented by the products of reaction of maleic anhydride on polyhydroxylated organic compounds having at least two hydroxylated groups. The hydroxylated organic compounds which have preferred use are the following: saturated and unsaturated aliphatic alcohols, cycloaliphatic alcohols, and aromatic alcohols; these alcohols may bear alkyl, alkoxy, and halogen substituents and may include one or more ester, ether, amide and urethane group in their structure. Among such polyhydroxylated compounds of particular utility are ethylene glycol; propylene glycol; butylene glycol-1,3; propane diol-1,3; butane diol-1,4; pentane diol-1,5; hexane diol-1,6; trimethylol ethane; hexanetriol; pentaerythritol; ethyl-2-hexyldiol-1,3; hydrogenated bisphenol A; the monoallylether of trimethylol propane; the ethyl and propyl ethers of bisphenol A; diethylene-glycol; dipropylene-glycol; the polyoxypropylene glycols; and especially trimethyl-2,2,4-pentanediol-1,3, neopentyl-glycol, trimethylol propane, and glycerol.

Among the reticulating vinyl monomers of preferred use in the copolymerization are those of the group styrolene, chlorostyrolene, vinyl toluene, divinyl benzene, lower alkyl acrylates and methacrylates, vinyl acetate, propionate and pivalate, diallyl phthalate, triallylcyanurate, the dimethacrylate of butane diol-1,3, and the alkylvinylethers.

The polymerization inhibitors are advantageously represented by the group paratertiobutylcatechol, the monomethylether of hydroquinone, the monoethylether of hydroquinone, benzoquinone, tertiobutyl-2,5 hydroquinone, copper naphthenate and especially hydroquinone.

The following examples and the foregoing disclosure are representative of their respective classes and are not to be construed as limitations on the generalities herein expressed.

EXAMPLE 1 (FIG. 6 to 9)

A volume of 100 cc. of copolymerizable composition was prepared as follows: An oligoester having a maleic thermal group was prepared from trimethyl-2,2,4-pentanediol-1,3 and maleic anhydride and mixed with a double weight of ethyl acrylate as reticulant and with between 30 and 300 parts per million of a polymerization inhibitor from the group listed hereinabove. There was also intermixed 1 percent of a polymerization initiator titrating 50 percent benzoyl peroxide. The mixture was allowed to rest about 30 minutes assuring the escape of bubbles.

Sheets (1 and 2) of window glass 300 × 300 mm. and 2 mm. thick were washed in water, then in alcohol, and dried in air. The faces of these glass sheets which were to be the inner faces of the layered panel were then coated with an anchor coat to improve the adhesion of the interlayer. The anchor coat may be chosen advantageously from the hydrosoluble silanes. One of these sheets was then disposed horizontally and leveled with the treated face uppermost. Upon this face was placed a frame 3 of which the length of the sides is identical with that of the glass sheet and which had been prepared from a sheet of flexible polyvinyl chloride of which the thickness was identical with that of the plastic interlayer to be applied. In this example, the frame has a thickness of 0.5 mm. whereas the width of each of the sides of the frame was 10 mm. This frame constituted for the layered panel a thickness gauge forming a peripheral joint between the two glass sheets.

Into the container 4 formed by the glass sheet and the frame was carefully poured the polymerizable liquid composition 5 as described above so that it covered the whole surface of the glass and slightly overflowed the frame. The second sheet 2 of glass, coated face down, was then applied to the surface of the liquid taking care to avoid the entrapment of air bubbles. Clamps 6 were then applied to the periphery of the assembly and it was moved horizontally into a ventilated oven at a temperature of 60°C. Within the oven the following thermal treatment was followed:

The oven was maintained for 30 minutes at 60°C. and then raised to 65°, 70°, and 75°C. in steps, remaining at each of these temperatures for 15 minutes. At 75°C. the copolymerization was initiated by the peroxide. After the 15 minutes at 75°C. the temperature was raised to 95°C. for one hour, 30 minutes to two hours. The total thermal treatment took 3 hours including the time necessary to raise the temperature from one step to another.

The panel was then withdrawn from the oven without precaution, the clamps were removed and the panel was cooled. It was perfectly, optically homogeneous, did not diffuse, and was free of bubbles and inclusions.

EXAMPLE 2

The preparation of polymerizable liquid was made as described in Example 1 employing a volume of 2580 cc. of co-polymerizable ethyl acrylate. Two sheets of float glass 1000 × 1600 mm. by 3 mm. thickness were prepared as in Example 1 with one of the sheets laid horizontally, treated face up, and the joint gauge in place. The joint was prepared from a sheet of polyvinyl chloride 2 mm. thick and the interior was filled with the copolymerizable composition. The second sheet of glass, treated face down, was put in place and secured by clamps. An orifice was made in one of the sides of the frame near the end of one side and the liquid polymerizable composition was injected between the plates. There was thus formed an enclosure entirely closed except for the orifice, the major faces being those of the glass plates and the small faces those of the frame. The enclosure was then put on edge with the opening uppermost and the copolymerizable composition was injected through a small nozzle. The assembly was then mounted dry in a holder free of water. The copolymerizable composition and water to fill the holder were admitted together so that the level of the polymerizable liquid inside and the water outside stayed at about the same level. This filling technique is particularly valuable in preparing laminates of large dimensions as it prevents the formation of forces tending to separate or bend the glass sheets in either direction. The water in the holder is then heated in the following cycle: 15 minutes at 50°C., followed by a steady raise in temperature at 12°C. per hour up to 95°C. at which it is held until the total thermal treatment attained four hours. The panel is then withdrawn from the bath and dried before being subject inside a gas chamber to a cycle of 12 hours from −25°C. to +50°C. at a humidity of 50 to 95 percent.

EXAMPLE 3

The operation of Example 2 was repeated replacing ethyl acrylate by butyl acrylate. The process of preparation was the same and the thermal progress was identical.

The interlayers of the foregoing examples have a factor of losses above 0.5, attaining 0.8 for the interlayer prepared from ethyl acrylate for the reticulent. The transparent panels made from the compositions which have just been described have very high qualities of acoustical insulation as demonstrated in the graphs of FIGS. 2 to 5. These graphs are related to the differences in sound levels delta L decibels as a function of the frequencies expressed in Hz.

Figure 2:
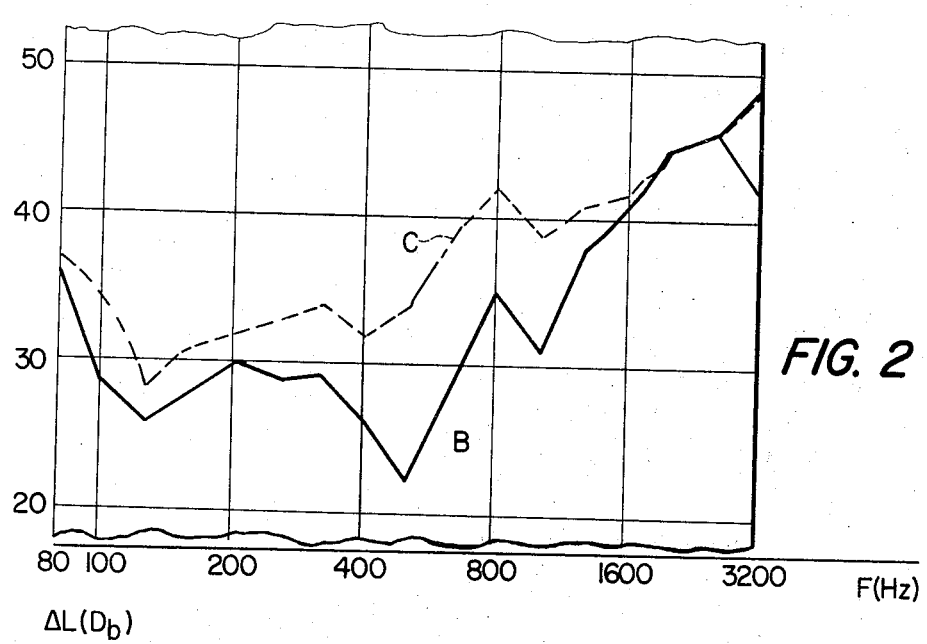

In FIG. 2 curve B relates to a layered glass panel formed of two plates of glass, each 3 mm. thick, and the inter-layer of air 3 mm. thick. Curve C relates to a layered panel according to the invention including two glass plates each 3 mm. thick and an interlayer 3 mm. thick constituted by the copolymerized composition of Example 1.

Figure 3:
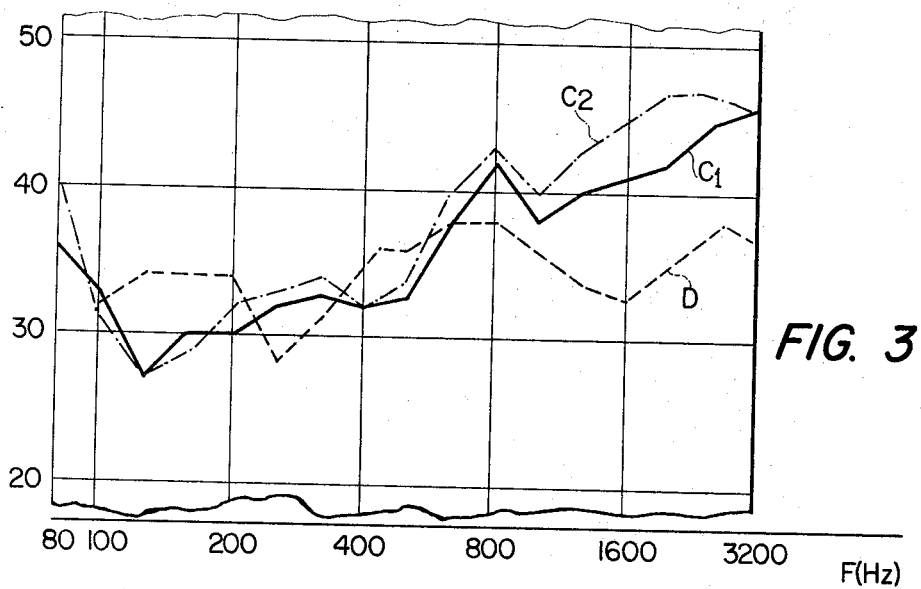

FIG. 3 shows a curve $C_1$ relating to a layered glass panel according to the invention including two plates of glass each 3 mm. thick and an interlayer 2 mm. thick constituted by the copolymerizable composition of Example 2.

Curve $C_2$ relates to a layered glass panel according to the invention having the same thicknesses of glass and interlayer as in Example 3 but including butyl acrylate as the reticulant in place of that of Example 3.

Curve D relates to a layered glazing having the same thicknesses of glass and interlayer as $C_2$ except that the interlayer substituted polymerized methyl methacrylate for the other reticulant.

Figure 4:
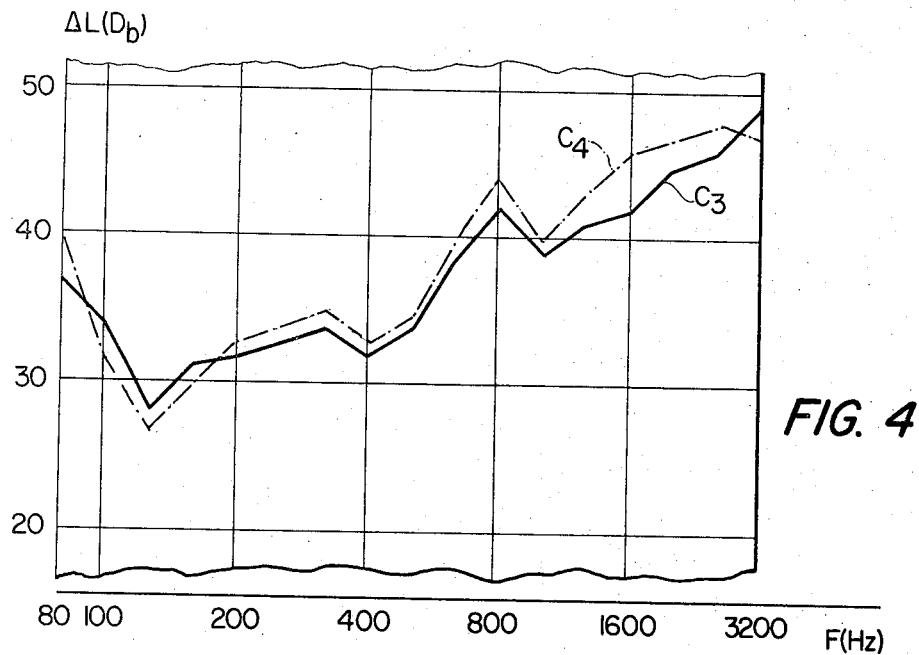

In FIG. 4, curve $C_3$ relates to a layered object involving two plates of glass, each 3 mm. thick, and an interlayer 3 mm. thick in which the oligoester was as in Example 1 and the reticulant was ethyl acrylate. In this figure curve $C_4$ represents the same copolymerizable composition except that the reticulant was butyl acrylate.

Figure 5:
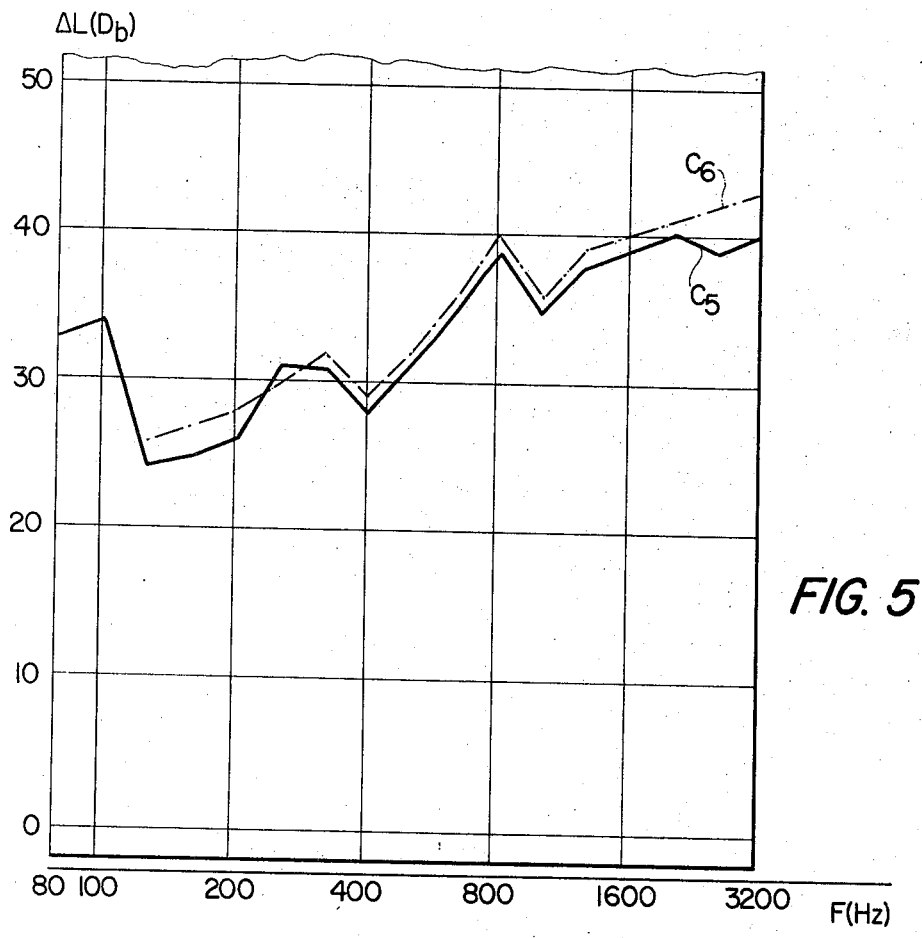
Figure 6:
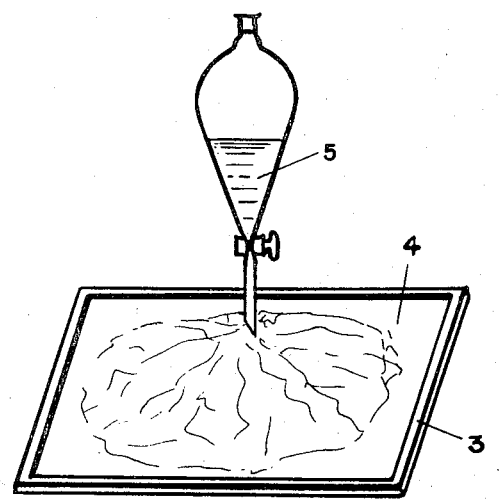
Figure 7:
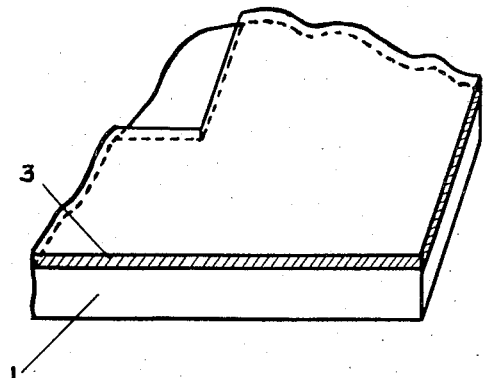
Figure 8:
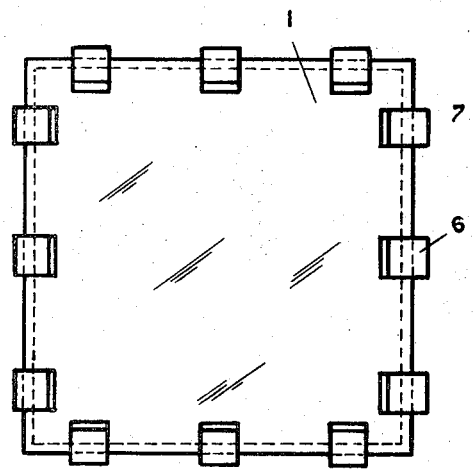
Figure 9:
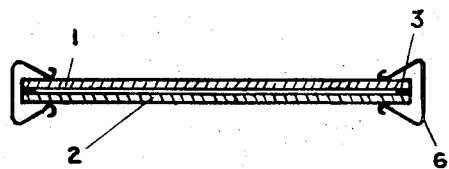

In FIG. 5, curves $C_5$ and $C_6$ relate to layered transparent panels according to the invention in which all layers of glass were 2 mm. thick and the interlayer of the apparatus tested to yield curve $C_5$ was 2 mm. thick whereas for $C_6$ it was 3 mm. thick.

In addition to the advantages of acoustical insulation these laminated products have the following advantages:

Their shock resistance is high. If you submit a window prepared according to Example 1 to a falling ball shock test it has been demonstrated that to produce breakage a 0.5 kg. ball must fall from a height of 1.2 meters, whereas for the same thickness (4.5 mm.) a sheet of window glass breaks under the same ball falling from a height of 0.25 meters and a sheet of tempered glass of equal thickness breaks under the same ball from a height of 1.2 m. It is thus apparent that this very novel laminate has as much breaking strength as tempered glass.

A laminate product by Example 2 when submitted to the same test was neither penetrated nor shattered by a fall of the ball from a height of 6 meters.

The laminate is therefore a safety panel having at least the resistance to shocks as tempered glass of the same thickness while possessing the qualities essential to safety glass, particularly having optical homogeneity, excellent resistance to aging and degradation of the interlayer, and perfect adherence of the plastic interlayer to the particles of glass broken by shock. It is equally noted that there is a conservation of resistance to the shock test for a wide range of temperature, remaining practically the same from −30° to +60°C.

To obtain equality of mechanical resistance the thicknesses of the laminates of this invention may be notably less than that of prior types of glass and prior laminates which substantially reduces the weight of windows per square meter.

The laminates of this invention may be made from sheets of mineral or organic glass, of vitrified sheets which have been annealed, or thermally tempered, or chemically reinforced, crystallized, made of ceramic and that they may be transparent, translucent, or opaque, and colored internally or on the surface.

The interlayer of plastic may be transparent, colored, photochromic, opalescent, and associable with a film of polyethylene terephthalate of optical quality which may also be transparent, colored, or surface coated.

The use of the liquid copolymerizable mixtures defined herein, as the interlayer, permits the production of products which simultaneously possess the different properties derived from the liquid resins, including among other things low viscosity before polymerization permitting a homogeneous and ready distribution of the polymerization initiator and the rapid release of bubbles. This viscosity may be easily established at a value of less than 10 centipoises so that the complete release of bubbles following upon the introduction of the polymerizable liquid between the two sheets of glass requires only about 10 seconds. These compositions have very high transparency comparable to that of the glass which constitutes the outer layers of the laminate. The interlayer has permanent clarity; the operative procedure described in the examples does not introduce any alteration in the initial transparency of the liquid and the various steps of aging do not introduce any measurable change in optical quality. The interlayer has good adherence to vitrified materials. The cohesion of the interlayer film supports deformations without breaking, a quality which is intimately related to a good adherence to the glass. Before disruption of the film under impact a substantial plastic deformation which is not elastic has been observed, the disruption constituting the ultimate step in the destruction of the window. The interlayer has a uniform index of refraction after polymerization. After polymerization and hardening it exhibits a contraction which puts the glass to which it adheres under a strain favorable to its mechanical resistance. This shrinkage is frequently between 10 and 20 percent.

The optical and mechanical properties of the interlayer are retained for long periods of time and at high temperatures. A residence of 500 hours under a Xenotest type solar radiation lamp produces no degradation. It is the same for a series of 50 cycles for 12 hours, each cycle consisting in changing the test piece from +60° to −30°C. and back to 60°C. at relative humidity of 90 percent. This demonstrates high resistance to humidity.

The ingredients facilitate polymerization and shorten the heating cycle, for instance to less than three hours, and permit operation at moderate temperature of less than 95°C. under pressure. The new structure is favorable to the addition of materials which confer optical properties such as stability to light and of color. The interlayer is compatible with plastic films of high mechanical resistance such as those having a base of polyethylene terephthalate, etc., which is sold in commerce under the trade names Terphane and Mylar.

The compatibility with plastic film is particularly interesting because it makes possible the manufacture of transparent laminates of new properties by introducing into the thickness of the interlayer a film of polyethylene terephthalate a few tens of microns thick which possesses the optical quality. This plastic film may itself be colored, translucent and metallized. It may have a certain roughness of surface and, generally possess such optical characteristics or geometrical form susceptible of satisfying specific properties of windows and facings. One can thus obtain a glazing of perfect optical quality having high resistance to shock and the factors of security additionally increased by the fact that the glazing, even when broken, retains its faculty of hermetically separating two media.

The fact that the density of the polymer is nearly one presents the great advantage during the manufacture of the laminate by immersion in a container filled with water to be under equal pressures inside and out, preventing deformation during manufacture.

The manufacture by units described hereinabove is readily transposed to a continuous process, particularly with the horizontal process of Example 1. On a glass ribbon moving steadily along a path are disposed two lateral bands serving to contain the polymerizable liquids which serve to define the thickness of the film after polymerization. This is filled with a polymerizable liquid of the type described above adjusted to a suitable viscosity. This band thus formed and filled moves along until the bubbles have escaped then passes below and in contact with a second glass ribbon which acts as a cover to the first. The whole then passes through a thermal tunnel of convenient length and temperature control at a suitable speed, producing perfect polymerization and hardening. The band thus constituted issues from the tunnel and is cooled and cut. This method is economical for the manufacture of security laminates such as those useful in building construction.

As many apparently widely different embodiments of the present invention may be made without departing from the spirit and scope thereof, it is to be understood that the invention is not limited to the specific embodiments.

What is claimed is:

1. Laminated acoustical structures possessed of high properties of sound insulation comprising a plurality of layers of vitreous material and an interlayer, in which the thickness in meters of each of the layers of vitreous material is less than $20/C_L$, the shearing modulus of the structure is at least equal to that of the interlayer, and the factor of loss of the interlayer is at least 0.2, $C_L$ being the speed of propagation of longitudinal sound waves in the vitreous material in meters per second.

2. Laminated acoustical structures according to claim 1 in which the thicknesses of the layers of vitreous material is about $10/C_L$ and the factor of loss of the interlayers is at least 0.5, $C_L$ being the speed of propagation of longitudinal sound waves in the vitreous material in meters per second.

3. Laminated acoustical structures according to claim 2 in which the thickness of the layers of vitreous material establish the relation $R_1 h_1 = R_2 h_2$, $R_1$ and $R_2$ being the mass-volumes of the respective vitreous layers and $h_1$ and $h_2$ being the thicknesses of the respective vitreous layers in meters.

4. Laminated acoustical structures possessed of high properties of sound insulation comprising a plurality of layers of vitreous material and an interlayer, in which the thickness in meters of each of the layers of vitreous material is less than $20/C_L$, the shearing modulus of the structure is at least equal to that of the interlayer, and the factor of loss of the interlayer is at least 0.2, $C_L$ being the speed of propagation of longitudinal waves in the vitreous material in meters per second, and in which the interlayer is the copolymer of at least one reticulating vinyl monomer with the reaction product of maleic anhydride and at least one polyhydroxylated organic compound, in a mole ratio of about one mole of anhydride to each hydroxylated group, the reticulating vinyl monomers representing 15 to 70 percent by weight of the polymerizable ingredients.

5. Laminated acoustical structures according to claim 4 in which the polyhydroxylated organic compounds are comprised of at least one alcohol from the class of saturated and unsaturated aliphatic alcohols, cycloaliphatic alcohols, and aromatic alcohols, which may bear alkyl, alkoxy, and halogen as substituents, and which may contain ester, ether, amide, and urethane groups in their structure.

6. Laminated acoustical structures according to claim 5 in which the polyhydroxylated reactants are from the group trimethyl-2,2,4 pentanediol-1,3, neopentylglycol, trimethylol propane, and glycerol.

7. Laminated acoustical structures according to claim 4 in which the reticulating vinyl monomers are from the class of styrolene, chlorostyrolene, vinyl toluene, divinyl benzene, the acrylates and the methacrylates of lower alkyls, vinyl acetate, vinyl propionate, vinyl pivalate, diallylphthalate, triallyl cyanurate, the dimethacrylate of butanediol-1,3, and the alkyl-vinyl ethers.

8. A method of making acoustical panelling which comprises assembling a pack of sheets of vitreous material, filling it with a polymerizable compound comprising an oligoester being the reaction product of maleic anhydride on a polyhydroxy alcohol of the aliphatic, aromatic, and cycloaliphatic classes a reticulant of vinyl type and an inhibitor of polymerization effective at lower temperature, plus an initiator of polymerization effective at a higher temperature, and heating the assembly to a temperature at which copolymerization and hardening of the interlayer occurs.

9. A method according to claim 8 in which the heating is stepwise from an initial level circa 50°–60°C. to a terminal level circa 75°–95°C.

10. A thermal glazing having vitreous outer layers and an interlayer consisting essentially of a copolymer of a reticulating vinyl monomer and an oligoester containing at least one maleic group having a free acid function.

11. A method of making acoustical panelling which comprises fixing vitreous sheets apart a selected distance, filling the space between the sheet with a liquid compound, comprising a vinyl monomer and an oligoester having maleic radicals with a free acid function, and heating the panelling to polymerize the interlayer liquid to a solid state.

12. A method according to claim 11 which includes the step of coating the faces of the vitreous sheets which are to engage the interlayer with a size whereby to increase the adhesion of interlayer and sheets.

13. A method according to claim 11 in which the copolymerizable liquid is a mixture of 30 to 70 percent liquid vinyl monomer, and 70 to 30 percent of an oligoester having at least one maleic radical with a free acid function.

* * * * *